United States Patent [19]

Hunt

[11] Patent Number: 4,966,256

[45] Date of Patent: Oct. 30, 1990

[54] EMERGENCY BRAKE

[76] Inventor: John D. Hunt, 6186 Sandbury Dr., Huber Heights, Ohio 45424

[21] Appl. No.: 331,616

[22] Filed: Mar. 30, 1989

[51] Int. Cl.⁵ .................................... F16D 55/224
[52] U.S. Cl. .............................. 188/72.7; 188/72.6; 188/106 F; 192/70.24; 192/70.3
[58] Field of Search .................... 188/72.7, 72.8, 72.9, 188/72.6, 106 F; 192/70.23, 70.24, 70.3

[56] References Cited

U.S. PATENT DOCUMENTS

| | | | |
|---|---|---|---|
| 1,142,880 | 6/1915 | Hartman | 188/72.7 X |
| 1,843,594 | 2/1932 | Baker | 188/72.7 X |
| 2,063,443 | 12/1936 | Lambert | 188/72.7 X |
| 2,946,408 | 7/1960 | Peras | 188/106 F X |
| 3,194,349 | 7/1965 | Kershner et al. | 188/72.7 X |
| 3,500,968 | 3/1970 | Bosler | 188/72.7 |
| 3,545,573 | 12/1970 | Barton | 188/72.9 |
| 3,626,862 | 12/1971 | Korn et al. | 188/72.8 X |
| 3,976,168 | 8/1976 | Yamamoto | 188/72 D X |
| 4,036,329 | 7/1977 | Anderson | 188/72.7 |

FOREIGN PATENT DOCUMENTS

| | | | |
|---|---|---|---|
| 1368280 | 6/1964 | France | 188/72.7 |
| 124832 | 7/1983 | Japan | 188/72.7 |
| 1016633 | 1/1966 | United Kingdom | 188/72.9 |

Primary Examiner—George E. A. Halvosa
Attorney, Agent, or Firm—Robert W. Becker & Associates

[57] ABSTRACT

An emergency or parking brake for motor vehicles equipped with a disc brake unit that can be provided with an actuating arrangement for disengagement and engagement of outboard brake pad structure against a rotor or disc sandwiched with respect to an inboard brake pad structure via a cam mechanism. In one embodiment the cam mechanism includes a camshaft that carries a cam member fixed thereto and pivotable by a lever spring biased in one direction although pivotable about an axis of the camshaft by a cable with a bifurcated member or fork attached thereto. In a further embodiment there is provided a pivotable lever having a shaft secured thereto and pivotable thereby with cam threads being provided on the outer periphery of the shaft which can mate complementary to similar cam threads of a screw nut held by a plate to one side of the outboard pad shiftable by the rotation of the shaft with the cam threads thereon to cause engagement of the outboard brake pad against the rotor or disc sandwiched and parallel between the outboard pad and an inboard brake pad.

4 Claims, 6 Drawing Sheets

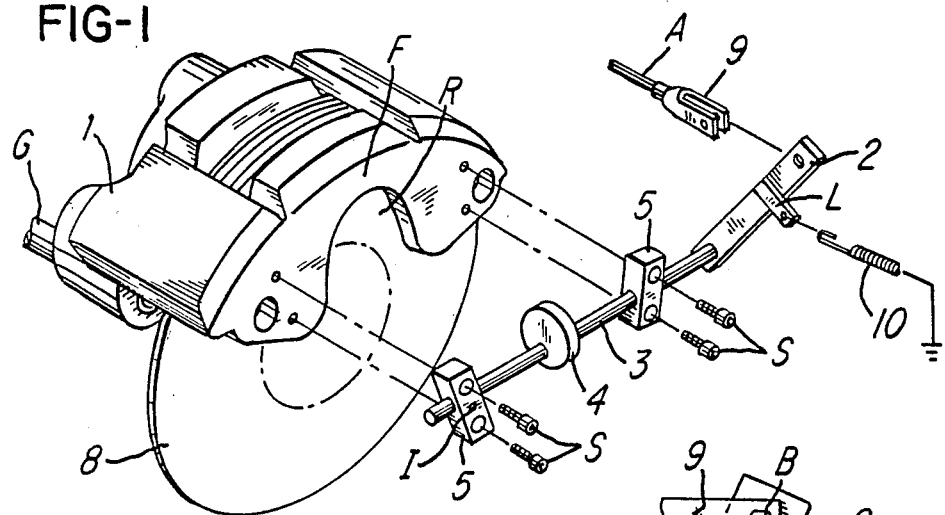
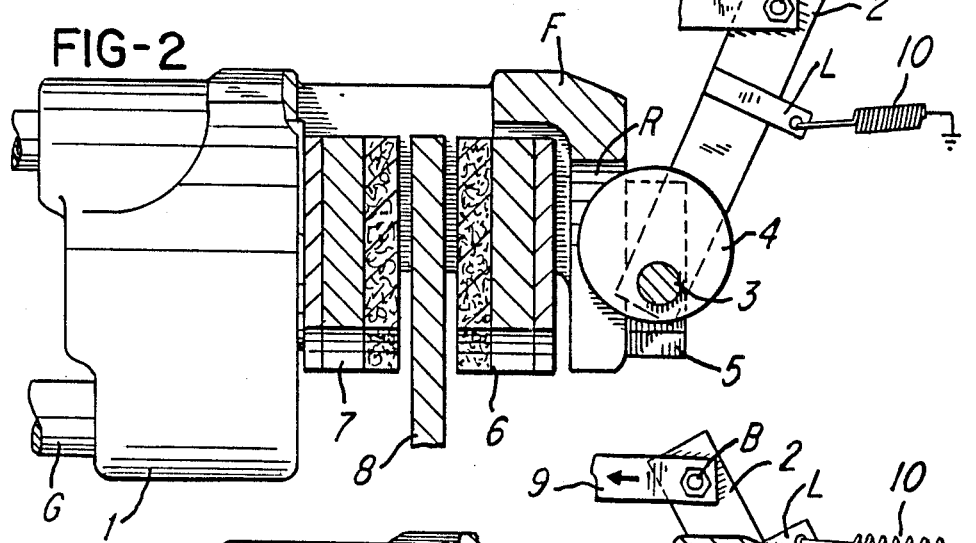
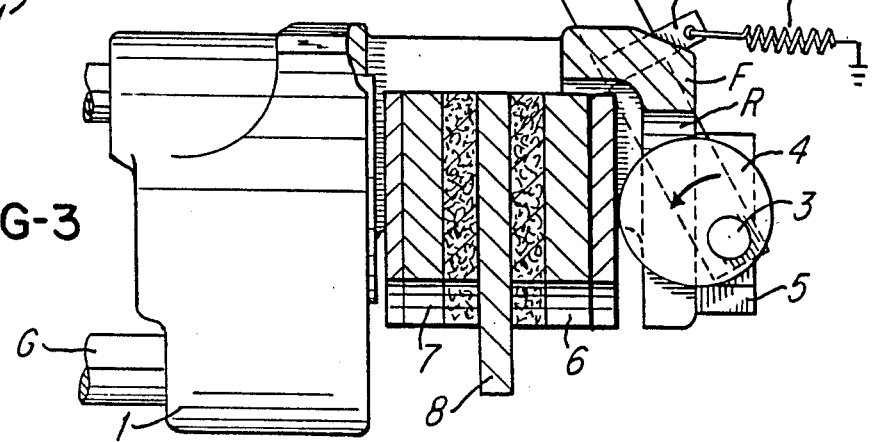

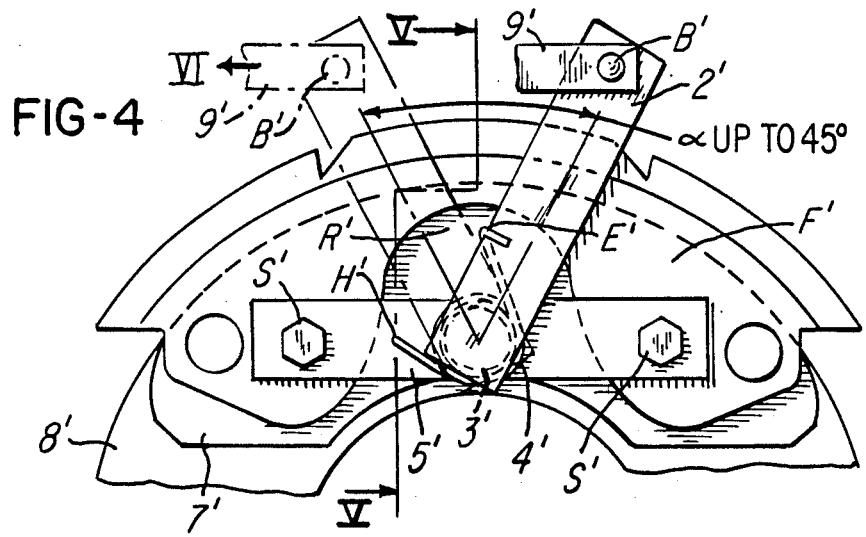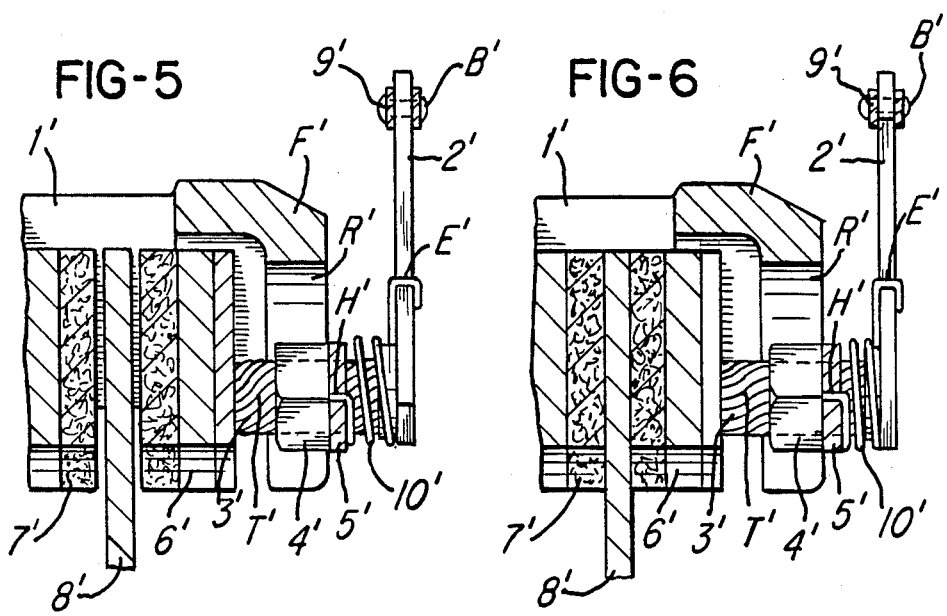

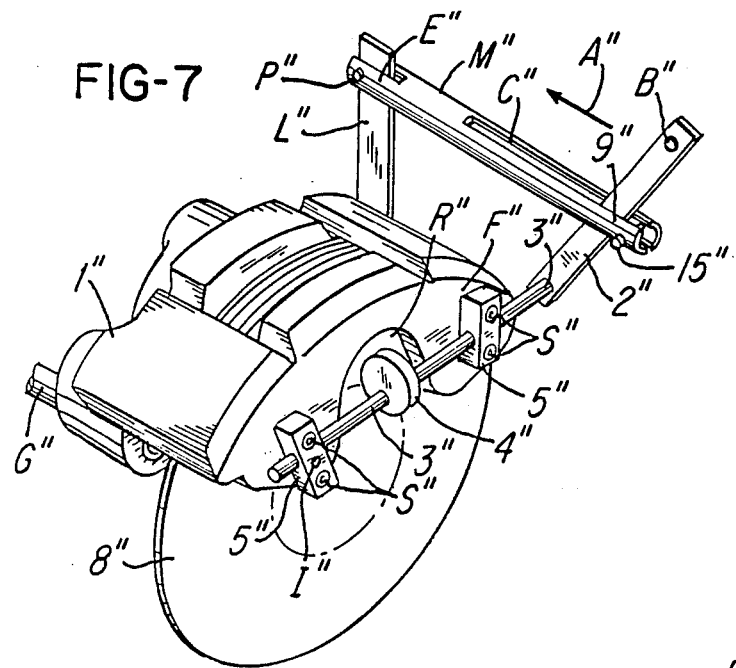
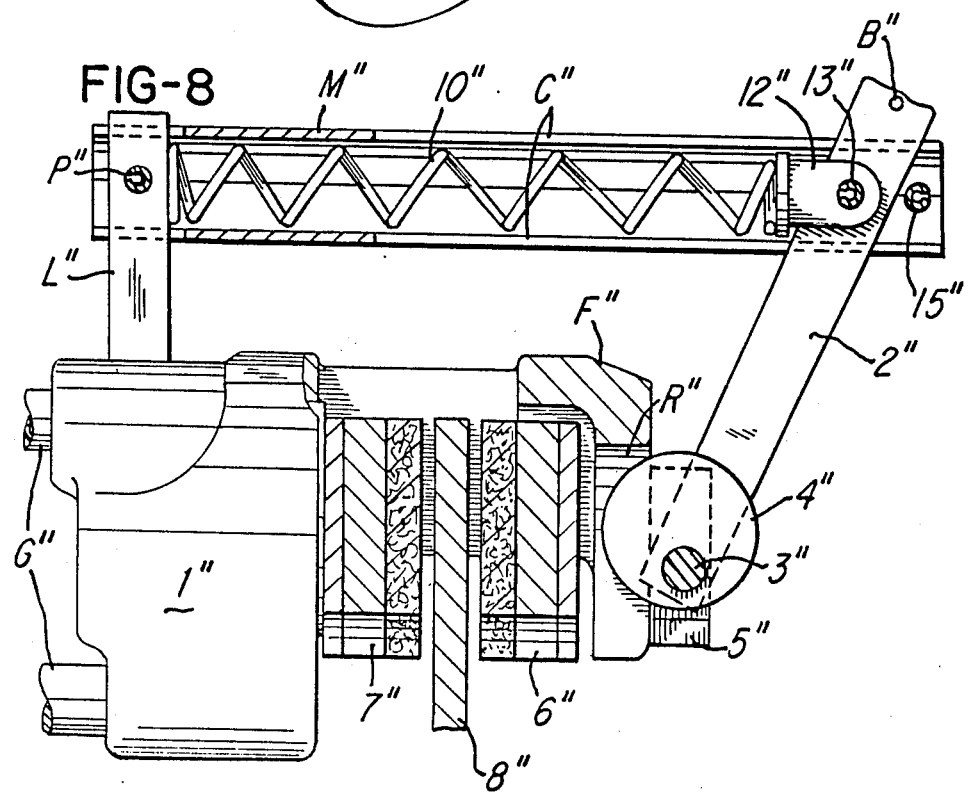

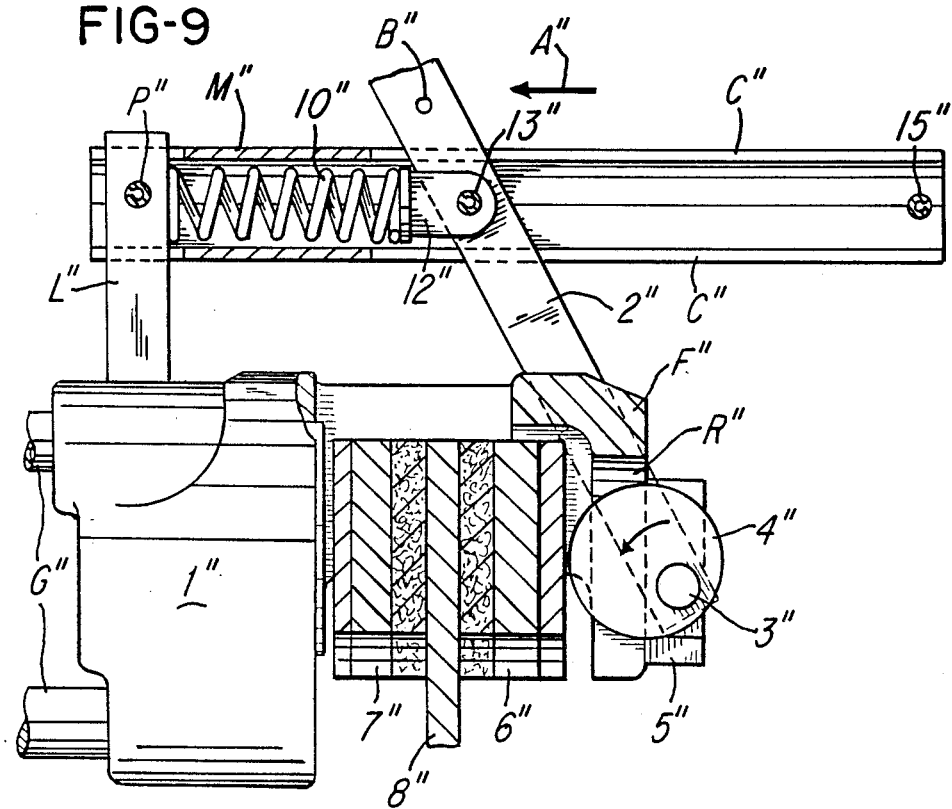

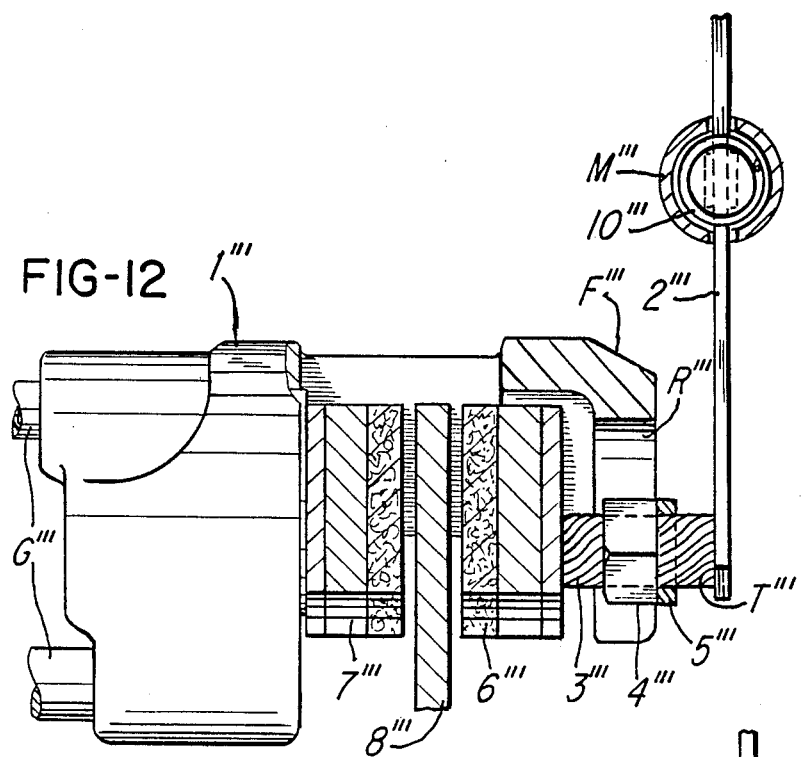
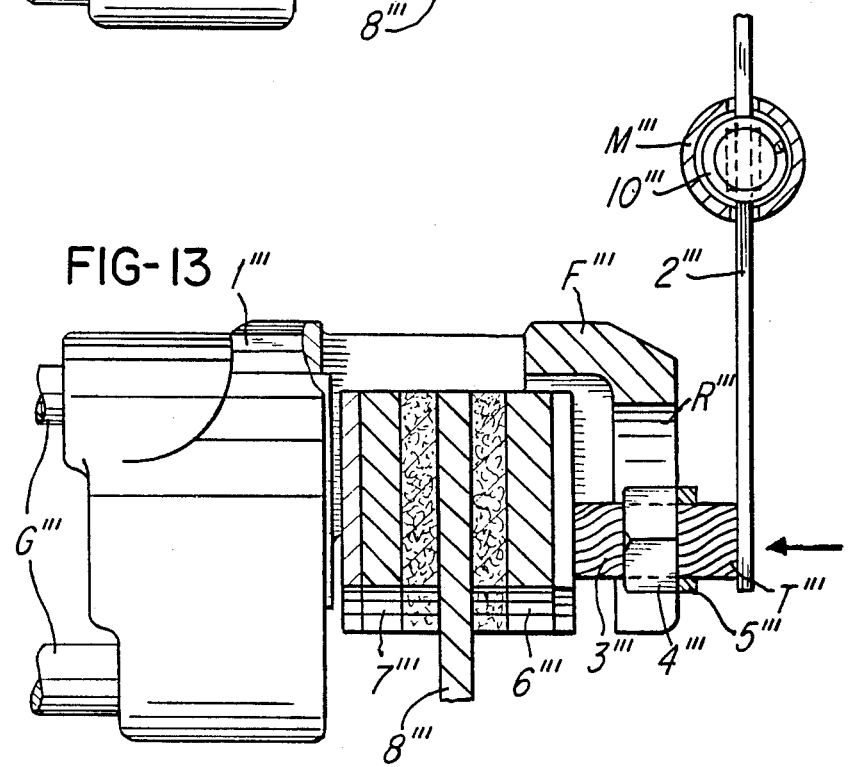

EMERGENCY BRAKE

BACKGROUND OF THE INVENTION

1. Field of the Invention

A mechanically-operated emergency or parking brake for motor vehicles having disc brakes and a minimum number of actuating parts in an operating arrangement can be improved to carry out the braking effect.

2. Description of the Prior Art

The arrangements of the prior art are all rather complex and costly so that the complicated actuation structure thereof results in considerable weight and expenditure for materials.

Harvey U.S. Pat. No. 3,659,681 dated May 2, 1972 discloses a disc brake including a pair of shoes mounted on a pair of pins and including a lever which acts upon the shoes. Another Patent Desvignes et al U.S. Pat. No. 3,035,664 dated May 22, 1962 discloses a disc brake including a rotatable disc adapted to be pressed between two wear pads, one of which is carried by an axially slidable housing and the other of which is axially movable with respect to the housing relative to which a series of push pins can operate against brake shoes. Furthermore, Rist U.S. Pat. No. 3,954,158 dated May 4, 1976 discloses a disc brake with mechanical operation including an operating lever which cooperates with one of the brake shoes through a cam surface as well as a transfer member on which the operating lever is articulated in a complicated arrangement.

Finally, Flotow U.S. Pat. No. 4,223,764 dated Sept. 23, 1980 discloses another complicated mechanically operable disc brake including a movable brake plate and a disc pressed against a fixed brake plate by a sliding cam operated by a lever.

An object of the present invention is to provide several modifications of embodiments of an emergency or parking brake for motor vehicles having a disc brake arrangement, with each of the embodiments being operable by pulling a cable or the like to pivot a rod on which a cam is disposed which then directly or indirectly engages an outboard pad of a disc brake to carry out the braking effect.

BRIEF DESCRIPTION OF THE DRAWINGS

These and other objects and advantages of the present invention will appear more clearly from the following specification in conjunction with the accompanying drawings, in which the inventive arrangement is illustrated with reference to the exemplary embodiments, and in which:

FIG. 1 is a perspective view that shows various parts of the emergency brake arrangement, at least some of the parts being shown in an exploded illustration to facilitate recognition of relationship of the parts with respect to each other;

FIG. 2 is a partially sectioned elevational view of the arrangement of FIG. 1 showing parts with the brake disengaged from emergency or parking brake operation;

FIG. 3 is a partially sectioned elevational view similar to that of FIG. 2 showing the arrangement with the parts actuated for engagement of the emergency or parking brake in accordance with the present invention;

FIG. 4 is a fragmentary elevational view showing a modification of the emergency or parking brake actuator arrangement also having features in accordance with the present invention;

FIG. 5 is a fragmentary cross-sectional view of the structural arrangement of FIG. 4 with the emergency or parking brake disengaged;

FIG. 6 is a fragmentary cross-sectional elevational view of the arrangement of FIG. 5 with the emergency or parking brake arrangement engaged;

FIG. 7 is a top perspective view of a further modification of the arrangement of FIG. 1 as provided with a slotted tubular member in which a coil spring means can be extended or compressed during brake actuation or disengagement of articulate lever means connected to the rod carrying a cam member on a camshaft;

FIG. 8 is a fragmentary partially sectioned elevational view of the arrangement of FIG. 7 with the emergency or parking brake disengaged;

FIG. 9 is a partially sectioned elevational view of the arrangement of FIG. 8 with the emergency or parking brake engaged;

FIG. 12 shows a fragmentary partially sectioned elevational view of still another embodiment of an emergency or parking brake arrangement with the spring-biased lever connected to a rod with the brake parts being disengaged in the positioning parts provided by this view; and FIG. 13 is a fragmentary partially sectioned elevational view of the arrangement of FIG. 12 showing the emergency or parking brake arrangement engaged in accordance with the features of the present invention.

SUMMARY OF THE INVENTION

Figure 10:
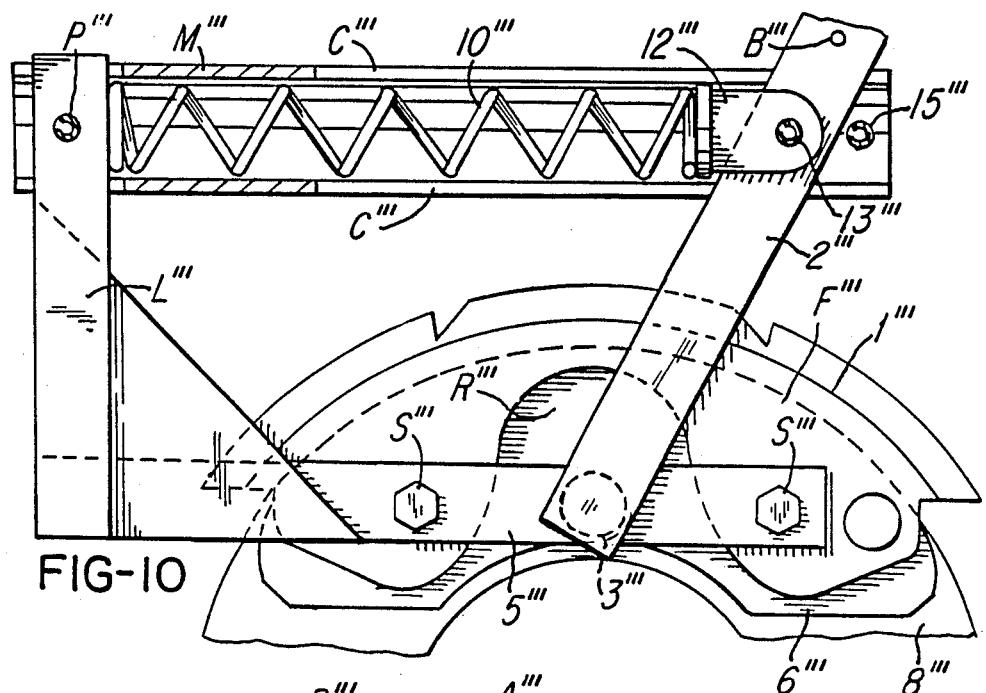
FIG. 10 is a fragmentary partially sectioned elevational view of a further emergency and parking brake arrangement similar to that of FIG. 4 although equipped with a tubular member housing a coil spring therein as to the articulated lever means in a manner similar to the arrangement of FIG. 8.

The arrangement of the present invention is characterized primarily in that a shaft or rod carrying a cam member or curved actuating portion is movable by a lever arm that pivots between disengaged and engaged positioning of the emergency or parking brake structure to cause disc brake pads to disengage or engage with respect to a disc positioned parallel to and in an intermediate location between the disc brake pads. The lever rigidly connected to the shaft is articulated for actuation purposes via a rod or cable connected to the shaft lever at an end thereof remote from the camshaft. The rod or cable connection can be modified as a slotted tubular member having a coil spring housed therein and movable longitudinally and axially of the tubular member during compression of the spring for emergency or parking brake actuation and disengagement of the disc brake pads as to the disc parallel in a sandwiched location therebetween. Also the end of the lever provided with the spring-biased arrangement of the coil spring in the tubular housing can have the end rigidly connected to the rod such that the rod has helical or spiral cam means extending peripherally and longitudinally thereof for spiral movement for engagement and disengagement of the disc brake pads as to the disc for emergency or parking brake engagement and disengagement.

Detailed Description of Preferred Embodiments

Referring now to the arrangement of FIG. 1, there is illustrated a brake unit that would work or operate on any type of caliper brake arrangement. The perspective view of FIG. 1 shows a disc or rotor 8 also shown in FIGS. 2 and 3. The disc or rotor 8 is positioned parallel to and in a location intermediate an outboard brake pad 6 and inboard brake pad 7. A pair of rectangular or elongated squared blocks 5 can be secured to a crescent-shaped face of a radially extending portion or flange of a caliper housing 1 and this flange surface has a recess located centrally of the crescent-shaped flange F so that a cam member 4 rigidly mounted on a camshaft rod 3 journalled by openings in the brackets 5 can be caused to move into and out of engagement with the outboard pads 6 to effect disengagement and engagement of the emergency or parking brake structure having features in accordance with the present invention.

A free end of the camshaft rod 3 located to one side of the brackets 5 carries a camshaft lever 2 secured at one end thereof to the camshaft rod 3. A fork or bifurcated member 9 is adapted to fit over an end of a lever 2 remote from the camshaft rod 3 so that a pivot means in the form of a bolt fastening B can hold a rod or cable actuator A connected to the shaft lever 2 for pivotal movement of the lever 2 about the axis of the camshaft rod 3 when affecting disengagement and engagement of the disc brake structure to have the inboard and outboard pads 6, 7 engage opposite sides or surfaces of the rotor or disc 8 as illustrated in FIGS. 2 and 3.

FIG. 2 shows the rotor or disc 8 with the inboard and outboard pads 6, 7 disengaged therefrom due to pivotal movement of the cam member 4 away from the outboard pad 6. Engagement of the cam member 4 occurs as illustrated in FIG. 3 during rotation of the cam member 4 in a counterclockwise direction represented by an arrow when the camshaft lever 2 is caused to pivot in a direction of an arrow shown with the fork or bifurcated member 9 in the illustration of FIG. 3. Caliper mounting pins or bolts G are shown in the views of FIGS. 1, 2 and 3 as to the caliper housing 1.

A tension spring 10 has one end thereof fitted through a hole of a link L rigidly secured to the camshaft lever 2 and an opposite end of the tension spring 10 is secured to a fixed or grounded location of a vehicle as schematically indicated. The camshaft rod 3 can have a groove means peripherally therein in a location coinciding with one of the blocks 5 so that a set screw I holds the camshaft in place against any disengagement or axial shifting out of an assembled relationship with respect to the blocks 5. The blocks 5 are held by screws S appropriately threaded to holes of the caliper flange F as outlined in FIG. 1.

A view of FIG. 2 shows the camshaft lever 2 moved via the articulated linkage of the fork or bifurcated member 9 joined by the pin or bolt fastening B to an end of the camshaft lever 2 fixedly secured to the camshaft rod 3 which carries the cam member or element 4 rigidly secured thereto; when the actuator A allows the tension spring 10 to pull the camshaft lever 2 in a direction to the right as shown in the views of the drawings, then the cam member or element 4 is out of engagement with the outboard pad 6 so that the outboard and inboard pads 6 and 7 are spaced from the rotor or disc 8 in a parallel location therebetween.

When the actuator A is pulled or moved to the left as seen in the drawings, then the fork or bifurcated member 9 via the pin or bolt connection B causes the lever 2 to have the cam member or element 4 carried by the camshaft rod 3 move in the direction of the arrow in FIG. 3 so as to compact or compress the outboard and inboard pads 6, 7 against the rotor or disc 8 against the bias of the tension spring 10. When the actuator A is released in a well known manner by manual operation of a vehicle driver or operator, the tension spring 10 is effective as a return spring for disengagement of the cam member or element 4 from the outboard pad 6 as shown in FIG. 2 of the drawings.

Referring now to FIGS. 4, 5 and 6, there can be noted that parts are identified by reference numerals having a prime added thereto. The caliper housing 1' is substantially identical to that of FIGS. 1–3 inclusive. In place of a pair of a rectangular shaped blocks 5 as shown in FIGS. 1, 2 and 3, there is noted that only a single bar 5' with an actuator screw nut 4' can be provided and opposite ends of the bar 5' with the actuator screw nut 4' can be secured by bolts or hexagonal-head screws S' as shown in FIG. 4.

The actuator lever 2' at one end thereof has a bolt or fastening means B' secured to a fork or bifurcated 9' with pivotal movement of the actuator lever 2' occurring about an axis of a modified brake rod member 3' having cam-like threads with a pitch complementary to similar cam-like threads T' complementary to similar threads about the inner circumference of the bore of the actuator screw nut 4' fitted centrally to a side of the block or bar 5' in a location opposite to the side where the end of the actuator lever 2' is secured rigidly to an end of the brake rod 3' having the cam threads T' thereon.

A movement of the actuator lever 2' as indicated by an arrow VI in FIG. 4 causes the actuator lever 2' to move pivotally about the axis of the brake rod having the cam thread T' thereon mating with complementary cam threads of the actuator screw nut 4' so that such movement can cause the outboard brake pad to engage the disc 8' with the inboard brake pad 7' so as to hold the emergency or parking brake arrangement in an engaged position subject to a rod or cable connected to the fork or bifurcated member 9' being latched in position in a well known manner.

A coil or helical spring 10' has opposite ends thereof bent to hook against an edge E' of the actuator lever 2' and a hole H' in the bar 5' at a location spaced axially to one side of the axis of the actuator rod 3' having the cam threads T' thereon. Thus the spring 10' exerts a torsional force on the lever 2' which can be overcome by pulling the fork or bifurcated member 9' in the direction of the arrow VI for tightening or engaging the outboard pad 6' and the inboard pad 7' to sandwich the rotor or disc 8' therebetween when engagement is effected via cooperation of the cam thread T' with the complementary configuration about the inner periphery of the screw nut 4'

The emergency and parking brake arrangement of the embodiment of FIGS. 4, 5 and 6 has even fewer parts than that of FIGS. 1, 2 and 3 so that a further reduction in cost is made possible together with a reliable and safe engagement and disengagement of the emergency or parking brake arrangement in combination with the disc brake outboard pad 6', inboard pad 7' and the disc or rotor 8'.

The views of FIGS. 5 and 6 can be considered to be taken along a line marked with arrows V-V in FIG. 4. The pitch of the cam thread means T' is such that a movement covering an angle α up to 45° as indicated for the extent of movement of the actuator lever 2' in FIG. 4 will bring about the translatory movement of the outboard pad 6' relative to the inboard pad 7' to engage and sandwich the rotor or disc 8' therebetween.

The embodiment of FIGS. 7, 8 and 9 is similar to that of FIGS. 1, 2 and 3 so that reference numeral designations have double primes added thereto for identical parts. Thus a caliper mounting bolt or pin G" is provided extending from the caliper housing 1" having a flange face F" with a recess R".

The disc brake parts in the arrangement of FIG. 7 are shown assembled with respect to each other rather than in the exploded relationship illustrated in FIG. 1 of the drawings. The cam means 4" secured or attached to the camshaft 3" can be turned due to the pivotal movement of the actuator lever 2" brought about by a modification of the fork or bifurcated member 9" having an elongated and lengthened slot or channel C" extending longitudinally of a hollow tubular member M" pivotally secured at one end thereof by a pin or pivot P" relative to an extension L" positioned upwardly from the caliper housing 1". The pin or pivot P" serves to anchor a bifurcated end E" of the hollow tubular member M" so that an upper end of the extension L" has an end of a helical or coil spring 10" abutting thereagainst as best seen in the views of FIGS. 8 and 9 of the drawings.

The spring means 10" can be compressed by a pivotal movement of the actuating lever 2" in the direction of an arrow A" as shown in FIG. 9 so that a spring retainer pin or pivot 13" pivotally mounting or journalling a spring retainer pad 12" can move longitudinally and axially inside the hollow tubular member M" in order to cause a turning movement of the cam member 4" in the direction of the arrow as shown in FIG. 9 in order to compress or engage the outboard pad 6" into engagement against the rotor or disc 8" in a sandwich relation with respect to the inboard pad 7".

A spring retainer pin 15" is provided as mounted and secured transversely through a free end of the bifurcated fork or member 9" remote from the pivot pin P" to serve as a stop or abutment when the spring means 10" is released from a compressed positioning of FIG. 9 into the released positioning of FIG. 8 via rod or cable release with respect to the pivot bolt B" at an upper free end of the actuating lever 2".

The actuating mechanism of the hollow tubular member M" in FIGS. 7, 8 and 9 also can be adapted for an embodiment similar to that of FIGS. 4, 5 and 6 and illustrated in greater detail in FIGS. 10, 11, 12 and 13 of the drawings. Identical parts are identified by reference numerals having triple prime designations added thereto in the views of FIGS. 10, 11, 12 and 13.

Figure 11:
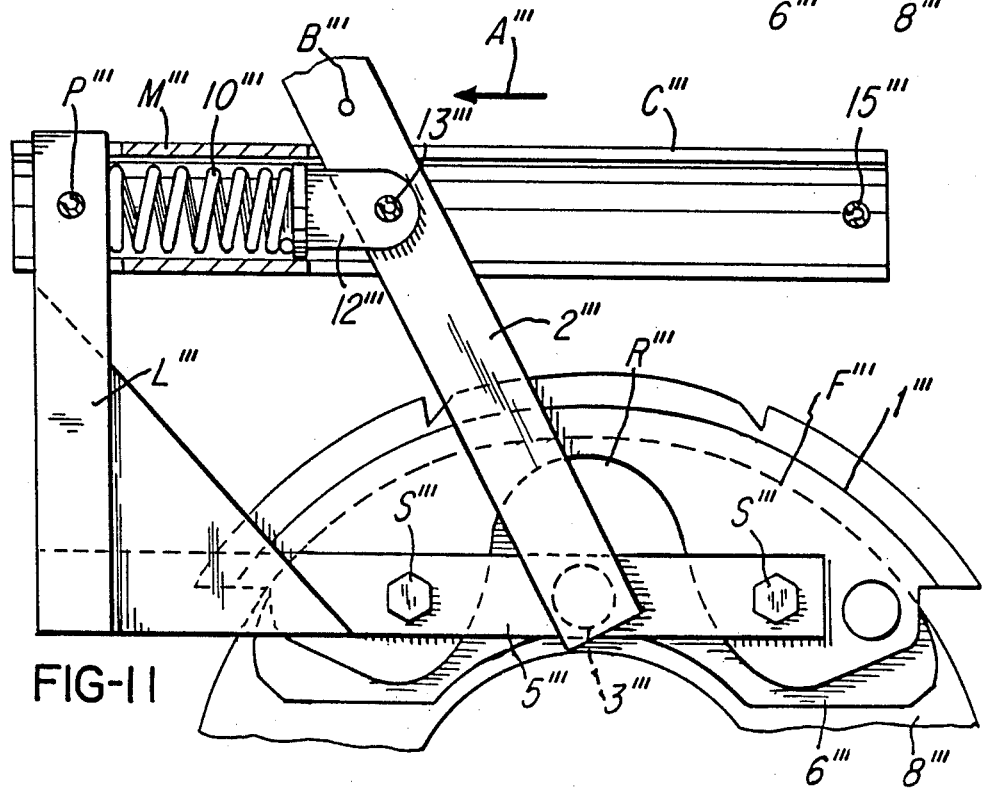
FIG. 11 shows the arrangement of FIG. 10 with the articulated lever means actuated to compress the spring for emergency or parking brake engagement in a manner similar to that of FIG. 9.

The return spring 10''' is shown in the compressed position in FIG. 11 comparable to the outboard pad 6''' engaging against the rotor or disc 8''' as sandwiched between the outboard pad 6''' and inboard pad 7'''. When the spring is released from its compressed positioning of FIG. 11 then the positioning exists as in FIG. 10 with the pads 6''' and 7''' being spaced a distance on either side of the disc 8''' as shown in FIG. 12 respectively.

The cam threads T''' indicated in FIGS. 12 and 13 operate complementary to cam threads internally along the inside periphery of the actuator screw nut 4'—.

The present invention is, of course, in no way restricted to the specific disclosure of the specification and drawings, but also encompasses any modifications within the scope of the appended claims.

What I claim is:

1. An actuator arrangement for an emergency/parking brake system of a vehicle having disc brake means including a caliper housing with an outboard brake pad, an inboard brake pad and a rotor/disc therebetween capable of being actuated for engagement and disengagement in a brake unit, comprising:
   a radially-extending crescent-shaped flange on the caliper housing in a location spaced along a side of said outboard pad and having a surface as well as a recess centrally and radially thereof;
   a camshaft located to one side of the outboard pad in a location remote from the caliper housing and having a predetermined location relative to said flange;
   journalling means mounting said camshaft relative to said caliper housing and positioned for providing predetermined limited pivotal movement of said camshaft in a location spaced relative to said flange;
   an actuating lever secured to an end of said camshaft in a location extending radially thereof;
   spring means biasing said actuating lever in a predetermined direction;
   cam means rigidly attached to said actuating lever for pivotal movement by said camshaft against said outboard pad to move said outboard pad into engagement with the rotor disc of said brake unit, said rotor/disc being sandwiched between said inboard pad and said outboard pad;
   a pair of rectangular block members provided as the journal mounting of said camshaft to position said cam means for engaging and disengaging said outboard pad and said inboard pad with respect to said rotor disc of said brake unit;
   said actuating lever at a location remote from said camshaft fastened thereto extending through a forked bifurcated member associated therewith;
   a link secured to said actuating lever at an intermediate location between opposite ends thereof, said spring means abutting a free end of said link for biasing said actuating lever in said predetermined direction;
   said spring means being anchored at one end and a pivot bolt being secured through an opening of said actuating lever for pivotal connection of said link thereto; and
   said forked bifurcated member being a hollow tubular means slotted longitudinally and axially thereof, said spring means being mounted in said hollow tubular member for stress of said spring means by pivotal movement of said actuating lever.

2. An arrangement according to claim 1, in which said hollow tubular member at one end thereof has abutment means extending transversely thereof to limit movement of said actuating lever under force of said spring means when released to allow disengagement of said outboard brake pad from said rotor disc.

3. An arrangement according to claim 2, in which said longitudinal slotted portion of said hollow tubular member extends over half the longitudinal axial distance of said hollow tubular member and forms a limit in the opposite direction for said actuating lever.

4. An arrangement according to claim 3, in which an end of said hollow tubular member remote from said slotted portion is pivotally secured to an upwardly extending link on said caliper housing.

* * * * *